(12) United States Patent
Poveda Lerma et al.

(10) Patent No.: US 11,070,079 B2
(45) Date of Patent: Jul. 20, 2021

(54) INTEGRATED POWER SUPPLY SYSTEM FOR AUXILIARY SERVICES FOR POWER CONVERTERS

(71) Applicant: Power Electronics España, S.L., Valencia (ES)

(72) Inventors: Antonio Poveda Lerma, Valencia (ES); Santiago García Laorden, Valencia (ES); Miguel Ángel Gargallo Parra, Valencia (ES); David Dobón Giménez, Valencia (ES); Abelardo Salvo Lillo, Valencia (ES); David Salvo Lillo, Valencia (ES)

(73) Assignee: Power Electronics España, S.L., Valencia (ES)

( * ) Notice: Subject to any disclaimer, the term of this patent is extended or adjusted under 35 U.S.C. 154(b) by 29 days.

(21) Appl. No.: 16/628,583

(22) PCT Filed: Jun. 29, 2018

(86) PCT No.: PCT/ES2018/070468
§ 371 (c)(1),
(2) Date: Jan. 3, 2020

(87) PCT Pub. No.: WO2019/008204
PCT Pub. Date: Jan. 10, 2019

(65) Prior Publication Data
US 2020/0153271 A1 May 14, 2020

(30) Foreign Application Priority Data

Jul. 3, 2017 (ES) ................. ES201730880

(51) Int. Cl.
*H02J 9/06* (2006.01)
*H02J 3/38* (2006.01)
*H02M 7/493* (2007.01)

(52) U.S. Cl.
CPC .............. *H02J 9/062* (2013.01); *H02J 3/381* (2013.01); *H02M 7/493* (2013.01); *H02J 2300/24* (2020.01); *Y02B 10/70* (2013.01)

(58) Field of Classification Search
None
See application file for complete search history.

(56) References Cited

U.S. PATENT DOCUMENTS 6,057,609 A * 5/2000 Nagai ..................... H02J 9/061
307/66
6,150,737 A * 11/2000 Nilssen ................... H02J 9/062
307/66

(Continued)

FOREIGN PATENT DOCUMENTS

EP 2337184 A2 6/2011
EP 2337184 A3 2/2013

(Continued)

*Primary Examiner* — Rexford N Barnie
*Assistant Examiner* — Terrence R Willoughby
(74) *Attorney, Agent, or Firm* — The Webb Law Firm

(57) ABSTRACT

An integrated power supply system for auxiliary services for power converters comprises a sinusoidal filter connected between an auxiliary output of a DC-AC inverter module and an input of the auxiliary service transformer in such a way that a control module, by means of control commands, interrupts the main output of the DC-AC inverter module and enables the secondary output thereof to allow the auxiliary service transformer to generate the auxiliary AC power. The DC-AC inverter module is connectable to a DC source and supplies the power it generates to an AC network.

9 Claims, 9 Drawing Sheets

(56) References Cited

U.S. PATENT DOCUMENTS

| | | | |
|---|---|---|---|
| 7,701,083 B2 * | 4/2010 | Savage | G06F 1/263 |
| | | | 307/29 |
| 10,014,687 B2 | 7/2018 | Koh | |
| 2011/0276194 A1 | 11/2011 | Emalfarb et al. | |
| 2012/0235481 A1 | 9/2012 | Nakashima et al. | |
| 2012/0267952 A1 | 10/2012 | Ballatine et al. | |
| 2016/0359329 A1 | 12/2016 | Kim et al. | |

FOREIGN PATENT DOCUMENTS

| | | |
|---|---|---|
| EP | 3010110 A1 | 4/2016 |
| WO | 2010122273 A2 | 10/2010 |
| WO | 2010122273 A3 | 10/2010 |

* cited by examiner

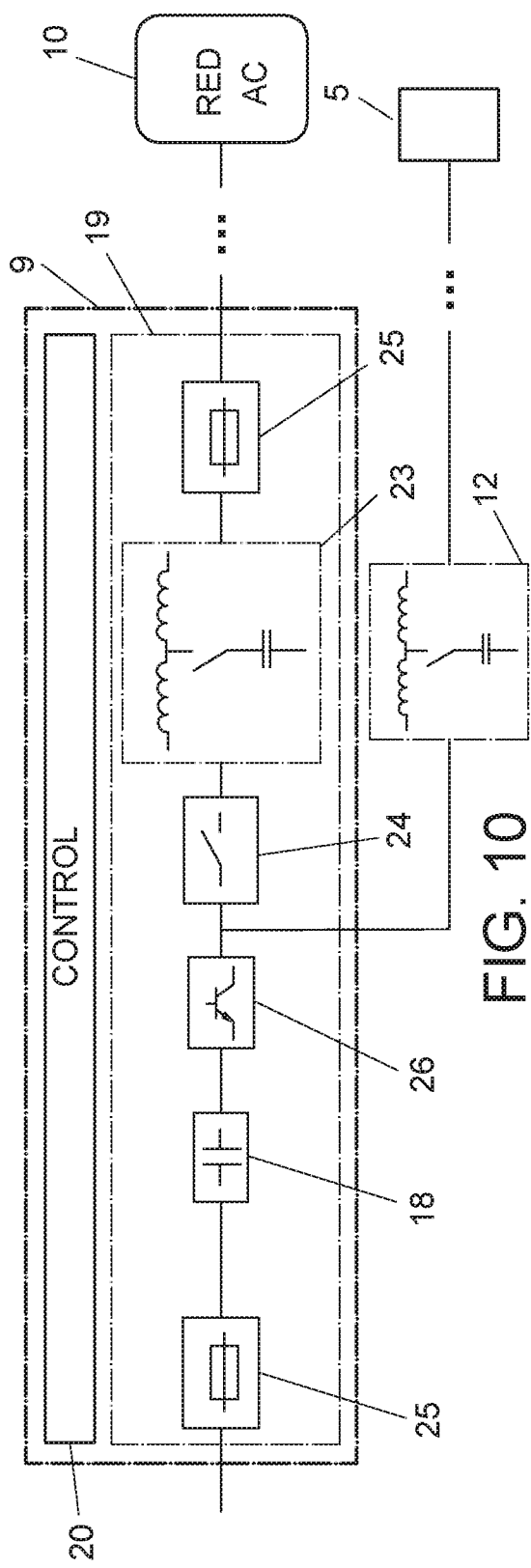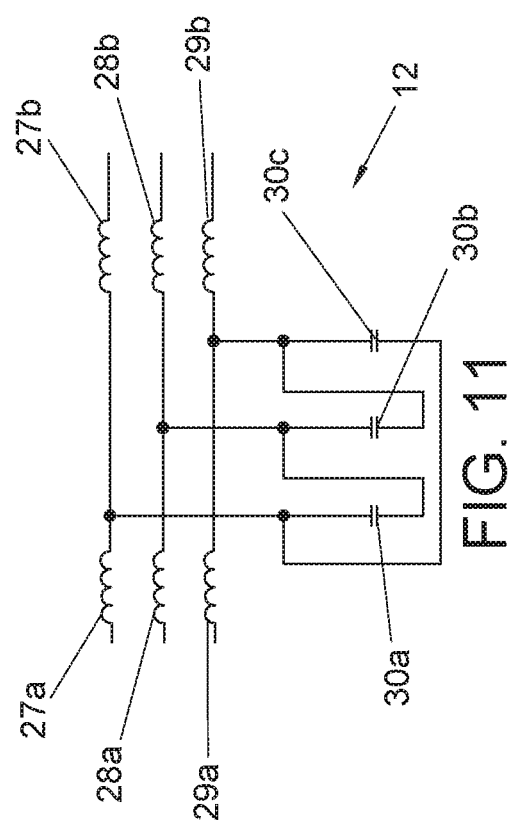

INTEGRATED POWER SUPPLY SYSTEM FOR AUXILIARY SERVICES FOR POWER CONVERTERS

CROSS-REFERENCE TO RELATED APPLICATION

This application is the United States national phase of International Application No. PCT/ES2018/070468 filed Jun. 29, 2018, and claims priority to Spanish Patent Application No. P201730880 filed Jul. 3, 2017, the disclosures of which are hereby incorporated by reference in their entirety.

FIELD OF THE INVENTION

The present invention relates to an integrated power supply system for auxiliary services for power converters.

The technical field of the invention belongs to the field of converters, generators, transformers and any other type of power system where there is a continuous DC voltage/current source and a continuous to alternate (DC/AC) voltage/current transformer element.

BACKGROUND OF THE INVENTION

The majority of electrical devices in general and power converter devices in particular that are connected to the AC network require auxiliary power supply devices to continue functioning in case of fault of the AC network to which they are connected.

Auxiliary power supply devices are known as UPS. An UPS (Uninterruptable Power Supply) is a device formed by a set of batteries and a control unit which can provide electric energy for a limited period of time to all the components or devices that they have connected.

Within the technical field of power converters, a UPS is used to provide a power supply source which allows certain functionalities configured by the user to be maintained in situations of faults or disconnections of the network. The functionalities which are connected to the UPS are considered those which should continue operating in spite of the fact that these disconnections occur (protections, monitoring devices, solar trackers in the case of the power converter being a solar inverter, etc.)

UPS used in power converters are large and heavy devices which, in addition to needing a large surface for their installation, require a large power consumption due to the fact that they are refrigerated. That is to say, current UPS are costly, complex and large.

Therefore, it would be desirable to be able to supply the power converters faced with a network fault, eliminating the drawbacks previously described and associated with the UPS.

DESCRIPTION OF THE INVENTION

The present invention is applicable to a power converter with DC-AC voltage/current conversion stage and with access to a DC voltage/current source. An example of these types of power converters are photovoltaic solar inverters.

Therefore, in a first aspect of the invention, an integrated power supply system is disclosed for auxiliary services for power converters. The integrated power supply system for auxiliary services for power converters comprises a sinusoidal filter connected between an auxiliary output of a DC-AC inverter module and an input of the auxiliary service transformer in such a way that a control module, by means of control commands, interrupts the main output of the DC-AC inverter module and enables the secondary output thereof to allow the auxiliary service transformer to generate the auxiliary AC power. The DC-AC inverter module is connectable to a DC source and supplies the power it generates to an AC network. The control module also controls the voltage/current that the DC-AC inverter module, by means of control commands, should generate to power the auxiliary transformer.

A particular embodiment of the invention would be photovoltaic solar inverters. For these devices, the DC power source would correspond to the photovoltaic field, while the DC-AC power conversion would be integrated into the device itself. In case of the solar inverter being modular, the conversion stage would be formed by a single inverter module, or by more than one as a function of the power required by the auxiliary services.

In one aspect of the invention, an integrated power supply system is disclosed for auxiliary services for power converters which comprises:
  an auxiliary transformer which comprises at least: two inputs and an auxiliary AC power output;
  at least two contactors;
  a sinusoidal filter whose output is connected to an input of the auxiliary transformer with interconnection of a contactor;
  at least one DC-AC inverter module which comprises an input and two outputs;
    where the input is connectable to a DC source, an output is connected to the input of the sinusoidal filter and the other output is connected to a shared AC line which in turn is connected to the auxiliary transformer with interconnected of a contactor and connectable to an AC network;
  a connection/disconnection contactor to the AC network situated in the shared AC line, between the output of the DC-AC inverter module and the AC network (10);
  a control module configured to send control commands and connected to at least:
    the connection/disconnection contactor to the AC network;
    the contactors;
    the DC-AC inverter module;
  such that the control module, by means of control commands, opens the connection/disconnection contactor to the AC network, opens the output contactor of the DC-AC inverter module, closes the output contactor of the AC sinusoidal filter and adjusts the voltage and current at the output of the DC-AC inverter module that connects to the sinusoidal filter so that the auxiliary transformer generates the auxiliary AC power.

In one embodiment of the first aspect of the invention, the integrated power supply system for auxiliary services for power converters also comprises at least one DC-AC inverter module with a single output connected to the shared AC line.

In one embodiment of the first aspect of the invention, the integrated power supply system for auxiliary services for power converters comprises at least two DC-AC inverter modules connected by means of two contactors to the sinusoidal filter such that the control module is configured to select, from among the at least two DC-AC inverter modules, at least one DC-AC inverter module to which to send the control commands and where the contactor associated with the selected DC-AC inverter module receives a close command.

In one embodiment of the first aspect of the invention, the integrated power supply system for auxiliary services for power converters, the DC-AC inverter module comprises a control step and a power step, wherein the power step comprises at least: fuses, a DC bus, a commutation electronics, a connection/disconnection contactor to the AC bus and a power filter. The sinusoidal filter is connected between the commutation electronics and the connection/disconnection contactor to the AC bus.

In one embodiment of the first aspect of the invention, the integrated power supply system for auxiliary services for power converters, the control module comprises a form of power supply selected from: the DC source, a set of batteries and the auxiliary AC power supply.

In one embodiment of the first aspect of the invention, the sinusoidal filter comprises at least two coils in series per monophasic phase and at least one capacitor connected in parallel between each two monophasic phases such that the Pulse-Width Modulation frequency "PWM" of the output voltage of the DC-AC inverter module is converted to a frequency of 50/60 Hz of the AC network.

In a second aspect of the invention, a power converter is disclosed which comprises an integrated power supply system for auxiliary services according to any one embodiment of the first aspect of the invention.

In a third aspect of the invention, a solar inverter is disclosed which comprises an integrated power supply system for auxiliary services according to any one embodiment of the first aspect of the invention.

In a third aspect of the invention, a modular solar inverter is disclosed which comprises an integrated power supply system for auxiliary services according to any one embodiment of the first aspect of the invention.

BRIEF DESCRIPTION OF THE FIGURES

FIG. 10 shows the electric connection of the sinusoidal filter to the DC-AC inverter module.
FIG. 11 shows an exemplary embodiment of the sinusoidal filter.

PREFERRED EMBODIMENT OF THE INVENTION

Figure 1:
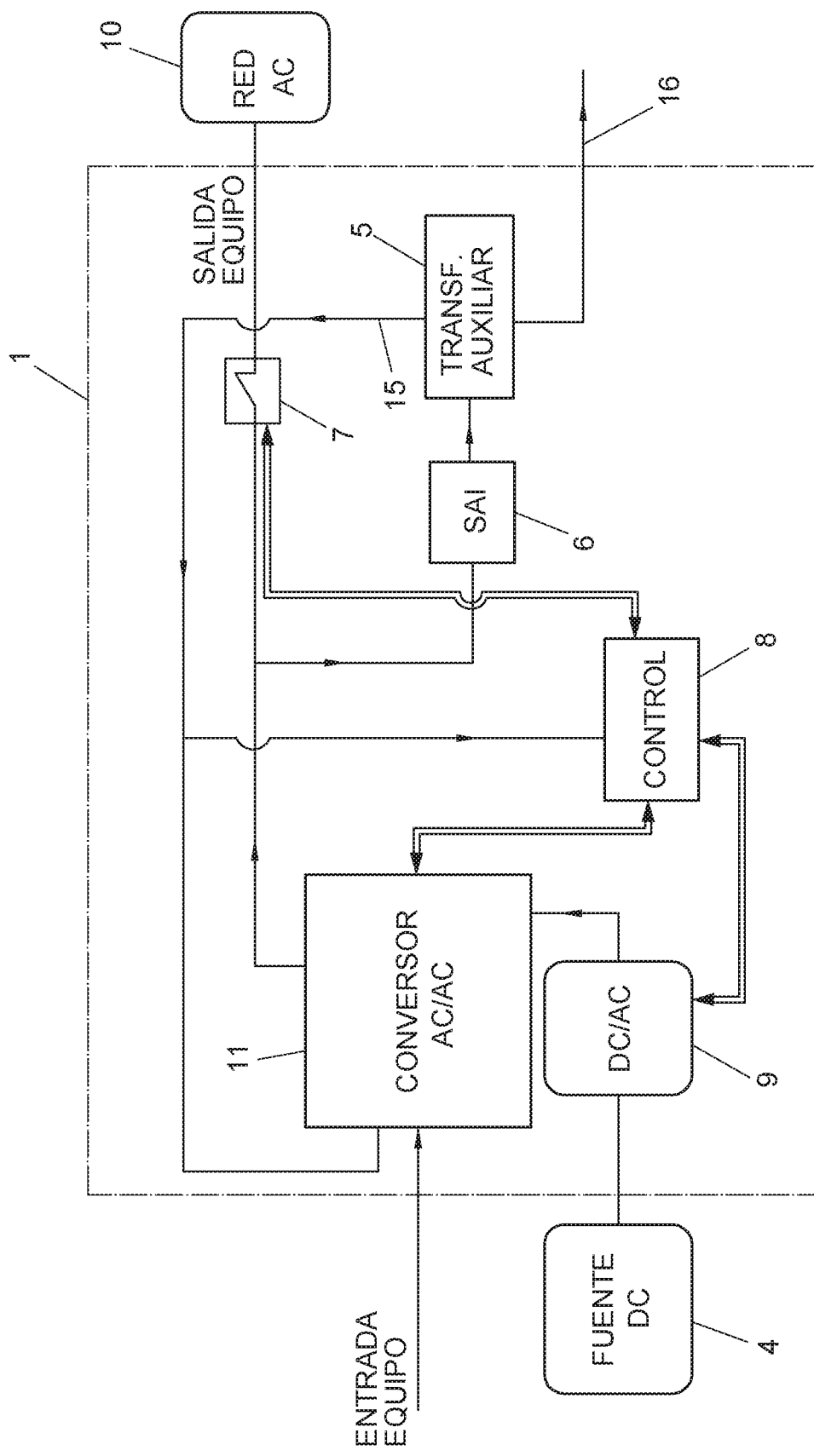
FIG. 1 power converter according to the prior art.

The references used in the figures are numbered below:
1. power converter
2. photovoltaic solar inverter
3. modular photovoltaic solar inverter
4. DC source
5. auxiliary transformer
6. UPS
7. connection/disconnected contactor to the AC network
8. control module
9. DC-AC inverter module; 9a to 9n—inverter modules
10. AC network
11. AC-AC converter
12. sinusoidal filter
13. 13a to 13n contactors (output of the inverter modules 9a-9n)
14. transformer of voltage means
15. auxiliary AC power supply
16. auxiliary user power supply
17. shared AC line of the inverter modules 9a to 9n
18. DC bus
19. power step of the inverter module
20. control step of the inverter module
21. contactor (of an input of the auxiliary transformer 5)
22. contactor (of another input of the auxiliary transformer 5)
23. power filter (included in the inverter module 9, 9a-9n)
24. connection/disconnection contactor to the AC bus
25. fuses
26. commutation electronics
27. coils (of the sinusoidal filter 12)
28. coils (of the sinusoidal filter 12)
29. coils (of the sinusoidal filter 12)
30. capacitors (of the sinusoidal filter 12)
31. battery Before detailing the exemplary embodiment of the invention, functional schemes of a power converter, a photovoltaic solar inverter and of a modular photovoltaic solar inverter according to the prior art are shown in FIGS. 1, 2 and 3, respectively.

The power converter 1 shown in FIG. 1 comprises the DC-AC inverter module 9 whose input is electrically connected to the DC source 4 and whose output is electrically connected to the AC-AC converter 11. The AC-AC converter 11 converts the output AC voltage of the DC-AC inverter module 9 into the voltage of the AC network, that is to say, it acts like an AC-AC transformer both in module and frequency. The electric output of the AC-AC converter 11 is connected to the AC network 10 by means of a connection/disconnection contactor 7. The electric output of the AC-AC converter 11 is also connected to the UPS 6 to recharge the same and for the power supply of the auxiliary transformer 5 consequently the output of the UPS 6 is electrically connected to the input of the auxiliary transformer 5. The auxiliary transformer 5 has two power supply outputs, one is the auxiliary AC power supply 15 and the other is the auxiliary user power supply 16. The function of the auxiliary AC power supply 15 is to supply the components of the power converter 1 for its normal operation. In FIG. 1, for the sake of simplicity, it is observed that the auxiliary AC power supply 15 is connected to the AC-AC converter 11 and to the control module 8, but can supply more components of the power converter 1. The control module 8 is connected, by means of a data link, to the AC-AC converter 11, to the DC-AC inverter module 9 and to the connection/disconnection contactor 7 to which it sends control commands. The control commands are instructions such as stop, start-up, magnitude of the output voltage, magnitude of the output, opening, closing current, etc. The arrows indicate the direction of the current in the electric connections.

Figure 2:
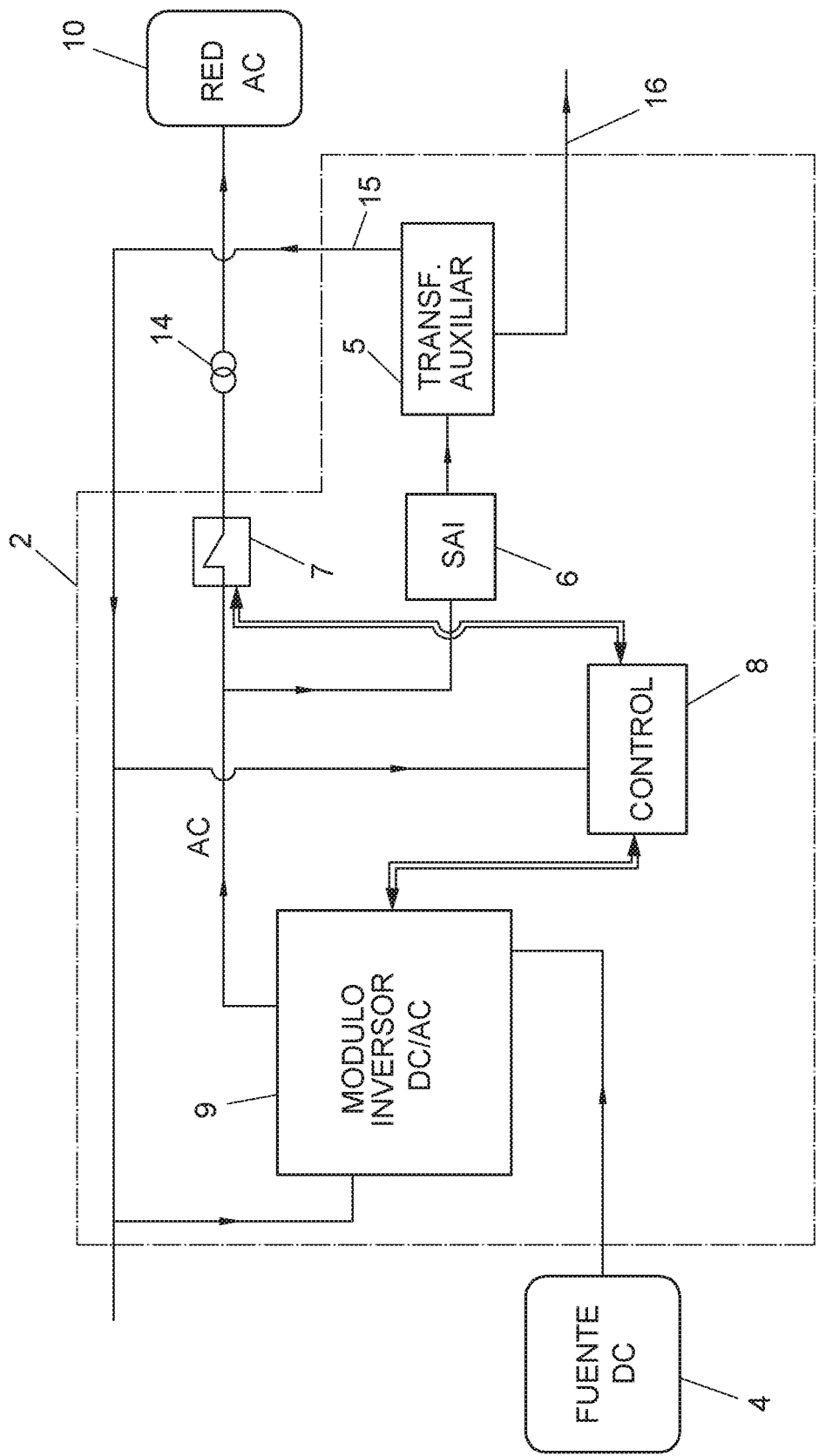
FIG. 2 photovoltaic solar inverter according to the prior art.

The photovoltaic solar inverter 2 as shown in FIG. 2 has a structure similar to the power converter 1 since it is an individualization of the latter. The photovoltaic solar inverter 2 comprises the DC-AC inverter module 9 whose input is electrically connected to the DC source 4. The output of the DC-AC inverter module 9 is electrically connected to the AC network 10 by means of the connection/disconnection contactor 7. Optionally, the AC-AC transformer of voltage means 14 may be between the output of the connection/disconnection contactor 7 and the AC network 10. The AC-AC transformer of voltage means 14 converts the AC output voltage of the DC-AC inverter module 9 into the voltage of the AC network 10 if required because both voltages are different. The electric output of the DC-AC inverter module 9 is also connected to the UPS 6 to recharge the same and for the power supply of the auxiliary transformer 5 consequently the output of the UPS 6 is electrically connected to the input of the auxiliary transformer 5. The auxiliary transformer 5 has two power supply outputs, one is the auxiliary AC power supply 15 and the other is the auxiliary user power supply 16. The function of the auxiliary AC power supply 15 is to supply the components of the photovoltaic solar inverter 2 for its normal operation. In FIG. 2, for the sake of simplicity, it is observed that the auxiliary AC power supply 15 is connected to the DC-AC inverter module 9 and to the control module 8, but can supply more components of the photovoltaic solar inverter 2. The control module 8 is connected, by means of a data link, to the DC-AC inverter module 9 and to the connection/disconnection contactor 7 to which it sends control commands. The control commands are instructions such as stop, start-up, magnitude of the output voltage, magnitude of the output, opening, closing current, etc. The arrows indicate the direction of the current in the electric connections.

Figure 3:
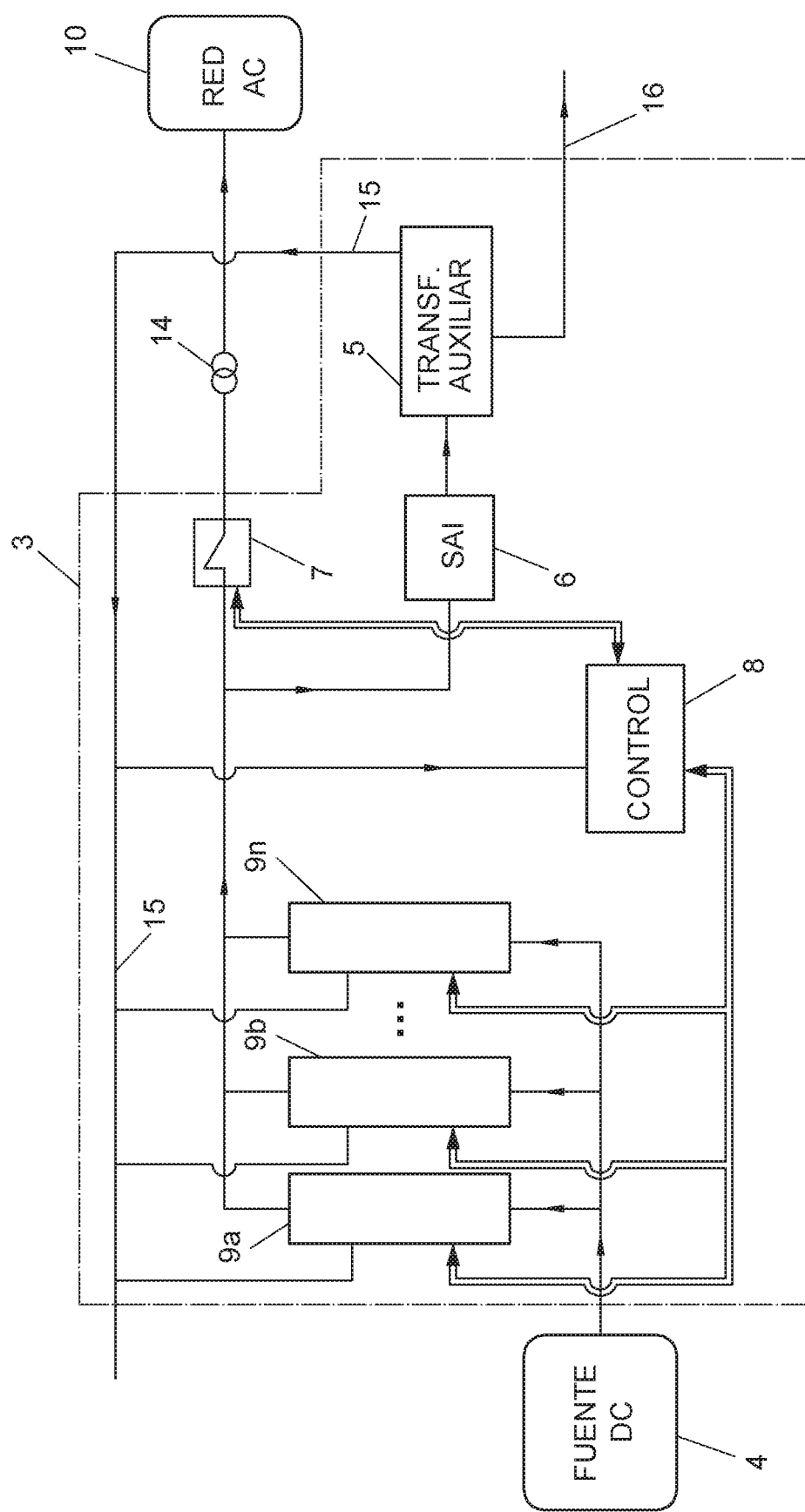
FIG. 3 modular photovoltaic solar inverter according to the prior art.
Figure 4:
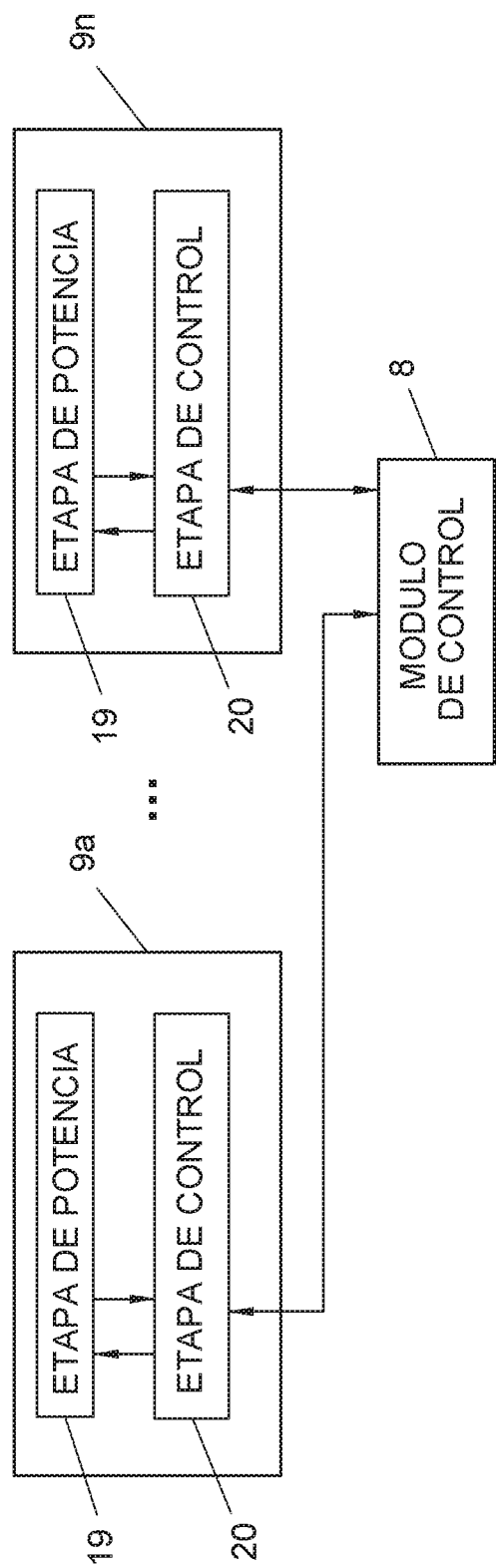
FIG. 4 main components of an inverter module.

FIG. 3 shows the general scheme of a modular photovoltaic solar inverter 3 according to the prior art. The photovoltaic solar inverter 3 has the same structure as the solar inverter 2 except in that it has various DC-AC inverter modules 9a-9n instead of a single inverter module.

For any exemplary embodiments shown in FIGS. 1, 2 and 3, FIG. 4 shows the main components of the inverter module 9, 9a-9n. Each one of the inverter modules 9, 9a-9n comprises a power step 19 and a control step 20. Each one of the control steps 20 are connected to the control module 8 to exchange control commands. The function of control step 20 is to monitor and register the direct current and bus voltage values to the input of the module, the intensity at the output of the commutation device and the temperature of the set of the commutation electronics. The registered values allow the state of the module to be managed, provide the trigger signals of the commutation electronic and the opening/closing orders of the DC and AC contactors, of the filter, of the soft charge circuit and also of the ventilation system. The power supply of this control step 20 comes from the auxiliary transformer.

Figure 5:
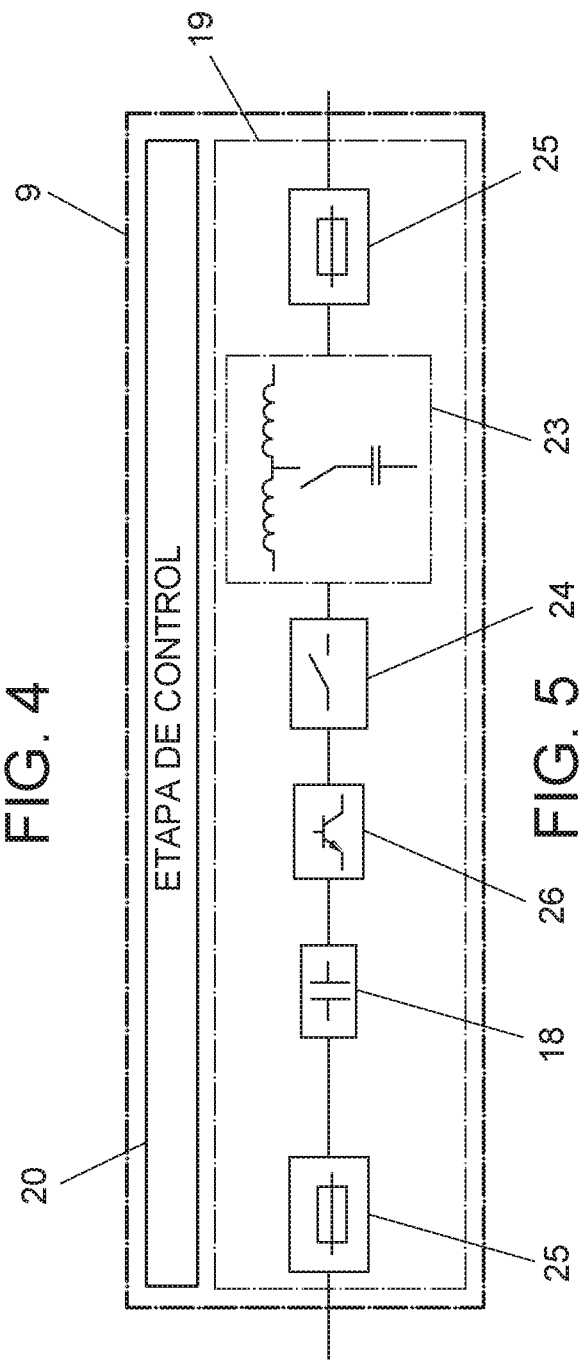
FIG. 5 shows the inverter module and its main components: the control step and the power step.

FIG. 5 shows the inverter module 9, the control step 20 and the power step 19. The main elements that form the power step 19 are the following: a DC bus 18, formed mainly by capacitors; commutation electronics 26 (IGBT) in turn formed by semiconductor devices whose state is regulated by a controller; a power filter 23; and a connection/disconnection contactor 24 to the AC bus, whose opening or closure is controlled by way of the control step 20. The power step 19 also includes fuses 25 and protectors against high current or voltage values. In the same manner, soft charge circuits (not shown) can be included to avoid current peaks inherent to the energization itself of the components during the first moments in which power is provided to the device. These soft charge circuits basically consist of a series of resistors that limit the current absorbed and whose effect is cancelled out by way of a bypass once the system is energized.

With respect to the control module 8, the control module carries out, amongst other things, the following functions:
 user interface for configuration, visualization and monitoring of the device.
 central control of the device and synchronization to network. Specifically:
  generates the current commands common to all the modules and effects the start-up/stop order of each module.
  carries out the MPPt calculation (in the case where the converter is a solar inverter).
  effects the operations of connection and disconnection and bus charge and discharge.
  controls and configures the protectors and measurements of the device.
  carries out the real-time acquisition of the voltage of the AC network and of the voltage of the source.
 Communication with the control of the modules.

Various exemplary embodiments of the invention are described below in an illustrative and non-limiting manner.

Figure 6:
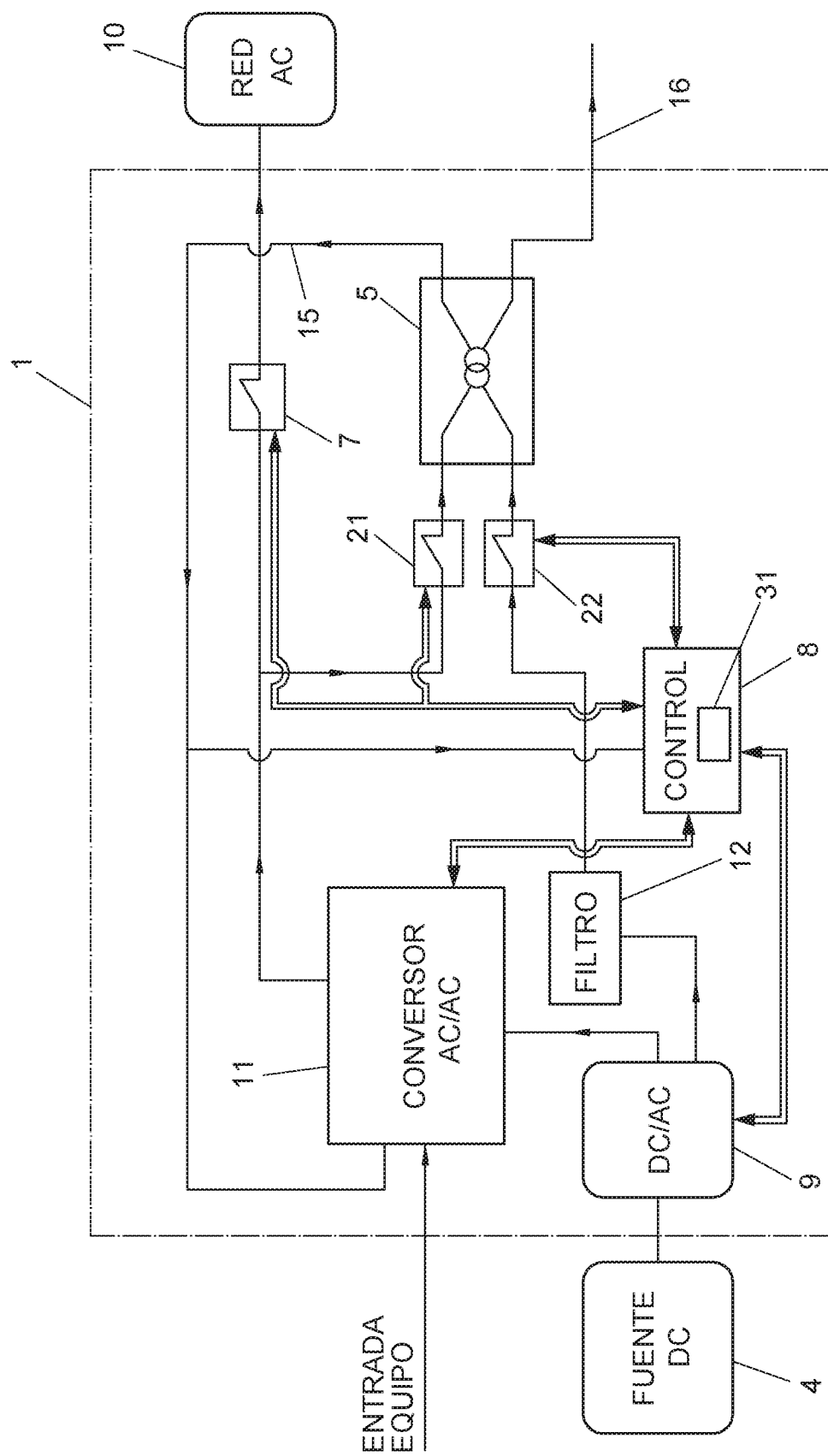
FIG. 6 integrated power supply system for auxiliary services applicable to power converters according to the present invention.

For the first exemplary embodiment, FIG. 6 shows the integrated power supply system for auxiliary services for power converters according to the present invention applicable to power converters as shown in FIG. 1.

The power converter 1 that comprises the integrated power supply system for auxiliary services according to the embodiment shown in FIG. 6 comprises the DC-AC inverter module 9 whose input is electrically connected to the DC source 4. The DC-AC inverter module 9 has two outputs, one output is electrically connected to the AC-AC converter 11 and the other output is connected to the sinusoidal filter 12. The AC-AC converter 11 converts the AC output voltage of the DC-AC inverter module 9 into the voltage of the AC network 10. The electric output of the AC-AC converter 11 is connected to the AC network 10 by means of a connection/disconnection contactor 7. The electric output of the AC-AC converter 11 is also connected to an input of the auxiliary transformer 5 with interconnection of the contactor 21 while the output of the sinusoidal filter 12 is connected to the other input of the auxiliary transformer 5 with interconnection of the contactor 22. The auxiliary transformer 5 has two power supply outputs, one is the auxiliary AC power supply 15 and the other is the auxiliary user power supply 16. The function of the auxiliary AC power supply 15 is to power the components of the power converter 1 for its normal operation. In FIG. 6, for the sake of simplicity, it is observed that the auxiliary AC power supply 15 is connected to the AC-AC converter 11 and to the control module 8, but can power more components of the power converter 1. The control module 8 is connected, by means of a data link, to the AC-AC converter 11, to the DC-AC inverter module 9, to the connection/disconnection contactor 7 and to the input contactors 21 and 22 to the auxiliary transformer 5 to all of which it sends control commands. The control commands are instructions such as stop, start-up, magnitude of the output voltage, magnitude of the output, opening, closing current, etc. When there is voltage in the AC network 10 and the power converter 1 works in "normal" or "production" mode, the contactors 7 and 21 are closed and the contactor 22 is open. In this way, the current (power) produced by the AC-AC converter 11 is supplied to the AC network 10. When the control module 8 detects an outage with the AC network which can be caused by maintenance works or by a fault in the AC network, the control module 8 makes the integrated power supply system for auxiliary services work in the following manner. The control module 8, by means of control commands, opens the connection/disconnection contactor 7 to the AC network, closes the connection/disconnection contactor 22 of the sinusoidal filter AC, opens the contactor 21 and adjusts the voltage and current at the output of the DC-AC inverter module 9 which after being filtered by the sinusoidal filter 12 arrives at the input of the auxiliary transformer 5, which generates the auxiliary AC power supply 15 and optionally the auxiliary user power supply 16. The control module 8 has a small battery 31 which allows it to carry out the previously indicated steps until it receives power from the transformer 5.

Figure 7:
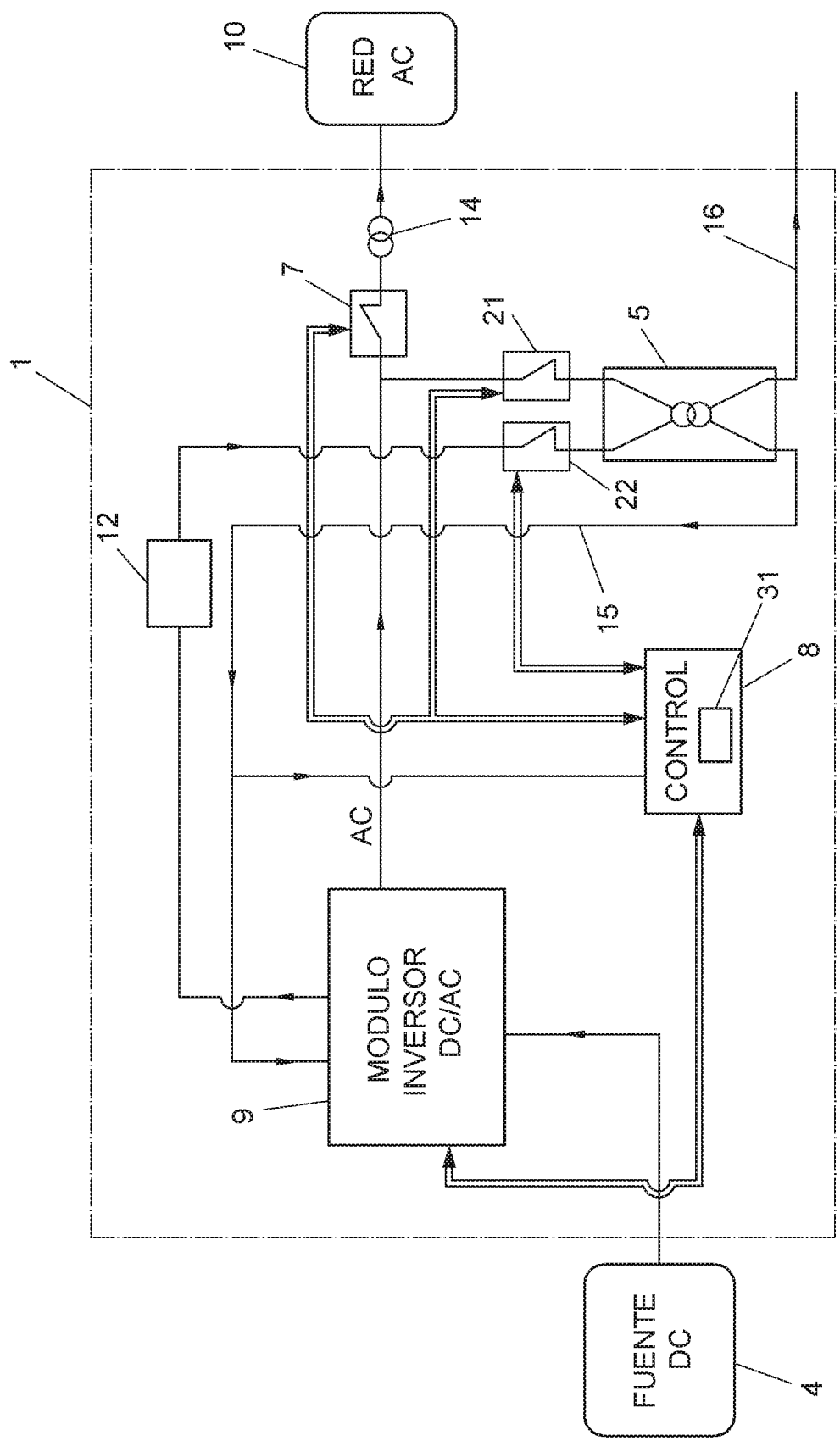
FIG. 7 shows the integrated power supply system for auxiliary services for power converters according to the present invention applicable to a photovoltaic solar inverter like the one shown in FIG. 2.

For the second exemplary embodiment, FIG. 7 shows the integrated power supply system for auxiliary services for power converters according to the present invention applicable to a photovoltaic solar inverter like the one shown in FIG. 2.

The photovoltaic solar inverter 2 shown in FIG. 7 comprises the DC-AC inverter module 9 which has an electric input and two electric outputs. The electric input is electrically connected to the DC source 4. One output of the DC-AC inverter module 9 is electrically connected to the AC network 10 by means of the connection/disconnection contactor 7. Optionally, the AC-AC transformer of voltage means 14 may be between the output of the connection/disconnection contactor 7 and the AC network 10. The output of the DC-AC inverter module 9 is also connected to a first input of the auxiliary transformer 5 with interconnection of the contactor 21. The transformer of AC-AC voltage means 14 converts the AC output voltage of the DC-AC inverter module 9 into the voltage of the AC network if required because both voltages are different. The other electric output of the DC-AC inverter module 9 is connected to the input of the sinusoidal filter 12 whose output is connected to a second input of the auxiliary transformer 5 with interconnection of the contactor 22. The auxiliary transformer 5 has two power supply outputs, one is the auxiliary AC power supply 15 and the other is the auxiliary user power supply 16. The function of the auxiliary AC power supply 15 is to power the components of the photovoltaic solar inverter 2 for its normal operation. In FIG. 7, for the sake of simplicity, it is observed that the auxiliary AC power supply 15 is connected to the DC-AC inverter module 9 and to the control module 8, but can power more components of the photovoltaic solar inverter 2. The control module 8 is connected, by means of a data link, to the DC-AC inverter module 9, to the connection/disconnection contactor 7 and to the contactors 21 and 22 to which it sends control commands. The control commands are instructions such as stop, start-up, magnitude of the output voltage, magnitude of the output, opening, closing current, etc. In the "normal" ("production") operating mode, that is to say, when the solar inverter supplies power to the AC network, the control module 8, by means of control commands, closes the connection/disconnection contactor 7 to the AC network 10, opens the contactor 22, closes the contactor 21 and adjusts the voltage and current at the output of the DC-AC inverter module 9. The DC-AC inverter module 9 also powers the auxiliary transformer 5, which generates the auxiliary AC power supply 15 and optionally the auxiliary user power supply 16. When the control modules 8 detects an outage with the AC network which may be caused by maintenance works or by a fault in the AC network, the control module 8, by means of control commands, opens the connection/disconnection contactor 7 to the AC network 10, opens the contactor 21, closes the contactor 22 and adjusts the voltage and current at the output of the DC-AC inverter module 9 which after being filtered by the sinusoidal filter 12 arrives at the auxiliary transformer 5, which generates the auxiliary AC power supply 15 and optionally the auxiliary user power supply 16. The control module 8 has a battery 31 which allows it to carry out the previously indicated steps until it receives power from the transformer 5.

Figure 8:
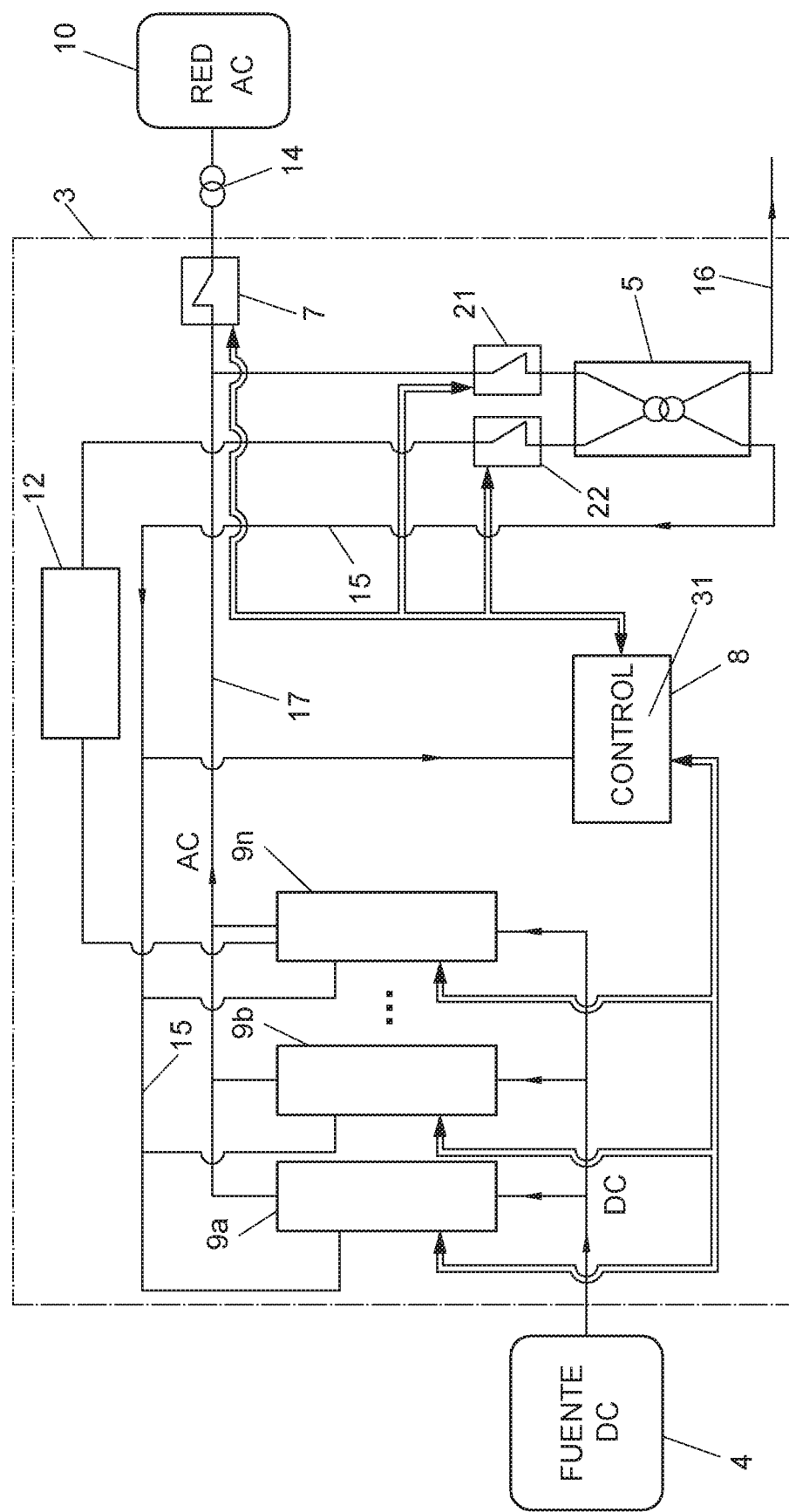
FIG. 8 shows the integrated power supply system for auxiliary services for power converters according to the present invention applicable to a modular photovoltaic solar inverter like the one shown in FIG. 3.

For the third exemplary embodiment, FIG. 8 shows the integrated power supply system for auxiliary services for power converters according to the present invention applicable to a modular photovoltaic solar inverter like the one shown in FIG. 3.

The modular photovoltaic solar inverter 3 shown in FIG. 8, which comprises the integrated power supply system for auxiliary services of the present invention, is of the "fixed voltage source module" type since only one of the inverter modules provides the power necessary for the auxiliary services. The modular photovoltaic solar inverter 3 comprises the DC-AC inverter modules 9a-9n whose input is electrically connected to the DC source 4. Each one of the DC-AC inverter modules 9a-9n has an AC electric output which connect to a shared line 17 (AC bus) which is electrically connected to the AC network 10 by means of the connection/disconnection contactor 7. Optionally, the AC-AC transformer of voltage means 14 may be between the output of the connection/disconnection contactor 7 and the AC network 10. The AC-AC transformer of voltage means 14 converts the AC voltage present in the shared line 17 at the output of the DC-AC inverter module 9a-9n into the voltage of the AC network if required because both voltages are different. The shared line 17 is also connected to an input of the auxiliary transformer 5 with interconnection of the contactor 21 such that the inverter modules 9a-9n power the auxiliary transformer 5. In this embodiment, only one inverter module 9n of the DC-AC inverter modules 9a-9n has a second AC electric output which is connected to the auxiliary transformer 5 with interconnection of the sinusoidal filter 12 and the contactor 22. The auxiliary transformer 5 has two power supply outputs, one is the auxiliary AC power supply 15 and the other is the auxiliary user power supply 16, which is optional. The function of the auxiliary AC power supply 15 is to power the components of the modular photovoltaic solar inverter 3 for its normal operation. In FIG. 8, for the sake of simplicity, it is observed that the auxiliary AC power supply 15 is connected to the DC-AC inverter modules 9a-9n and to the control module 8, but can power more components of the modular photovoltaic solar inverter 3. The control module 8 is connected, by means of a data link, to the DC-AC inverter modules 9a-9n, the contactors 21 and 22 and to the connection/disconnection contactor 7 to which it sends control commands. The control commands are instructions such as stop, start-up, magnitude of the output voltage, magnitude of the output, opening, closing current, etc.

In the "normal" ("production") operating mode, that is to say, when the modular solar inverter supplies to the AC network, the control module 8, by means of control commands, closes the connection/disconnection contactor 7 to the AC network 10, closes the contactor 21, opens the contactor 22 and adjusts the voltage and current at the common output 17 of the DC-AC inverter modules 9a-9n. The DC-AC inverter modules 9a-9n also power the auxiliary transformer 5 which generates the auxiliary AC power supply 15 and optionally the auxiliary user power supply 16. When the control module 8 detects an outage with the AC network which may be caused by maintenance works or by a fault in the AC network, the control module 8, by means of the control commands, opens the connection/disconnection contactor 7 to the AC network 10, opens the contactor 21, closes the contactor 22 and adjusts the voltage and current at the output of the DC-AC inverter module 9n which after being filtered by the sinusoidal filter 12 arrives at the auxiliary transformer 5, which generates the auxiliary AC power supply 15 and optionally the auxiliary user power supply 16. The control module 8 has a battery 31 which allows it to carry out the previously indicated steps until it receives power from the transformer 5.

Figure 9:
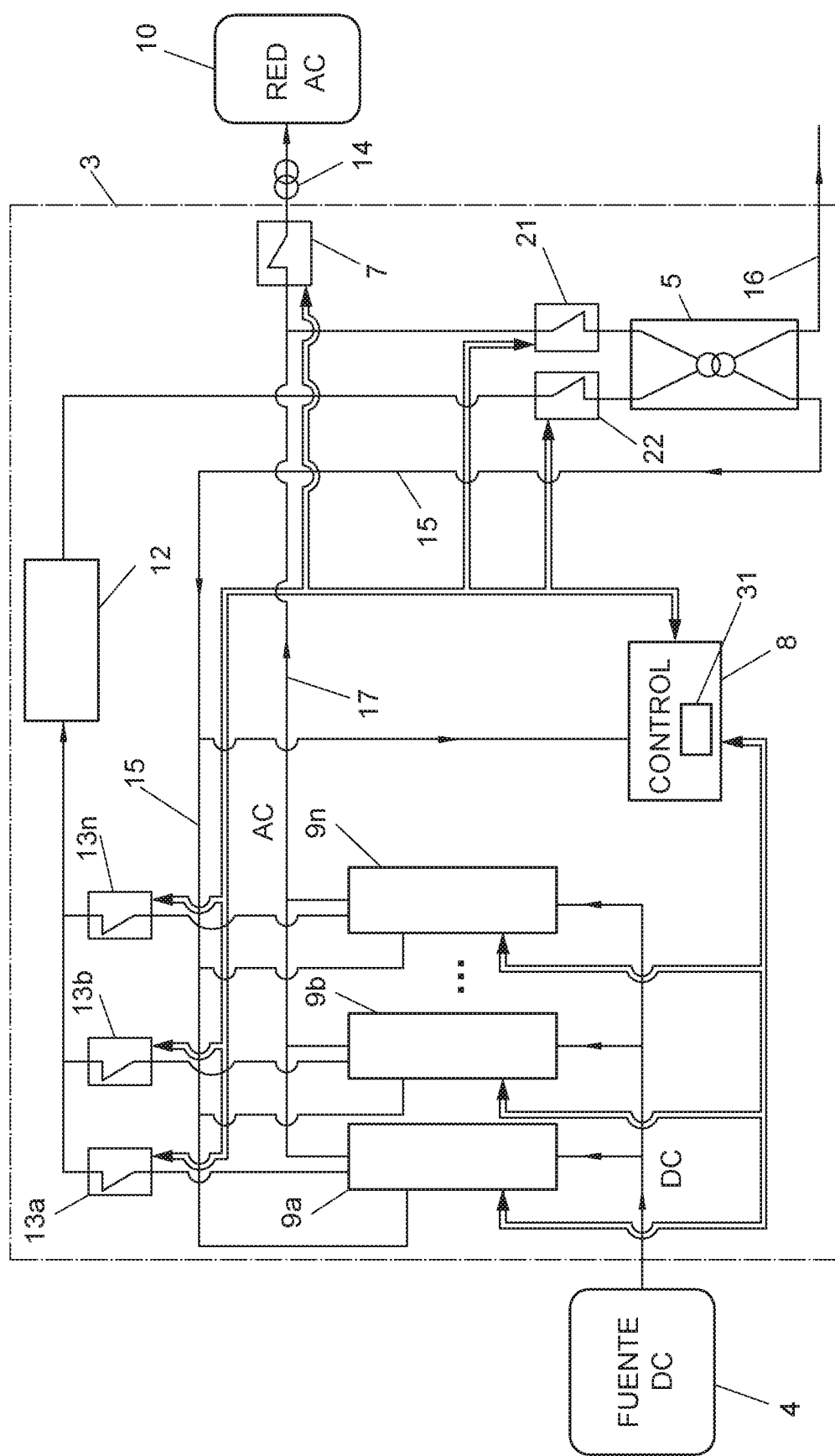
FIG. 9 shows the integrated power supply system for auxiliary services for power converters according to the present invention applicable to a modular photovoltaic solar inverter like the one shown in FIG. 3.

For the fourth exemplary embodiment, FIG. 9 shows the integrated power supply system for auxiliary services for power converters according to the present invention applicable to a modular photovoltaic solar inverter like the one shown in FIG. 3.

The modular photovoltaic solar inverter 3 shown in FIG. 9, which comprises the integrated power supply system for auxiliary services of the present invention, is of the "selectable voltage source module" type since it is possible to select which of the inverter modules provides the power supply necessary for the auxiliary services. The modular photovoltaic solar inverter 3 comprises the DC-AC inverter modules 9a-9n whose input is electrically connected to the DC source 4. Each one of the DC-AC inverter modules 9a-9n has an AC electric output which connects to a shared line 17 which is electrically connected to the AC network 10 by means of the connection/disconnection contactor 7. Optionally, the AC-AC transformer of voltage means 14 may be between the output of the connection/disconnection contactor 7 and the AC network 10. The AC-AC transformer of voltage means 14 converts the AC output voltage of the DC-AC inverter modules 9a-9n into the voltage of the AC network if required because both voltages are different. In this embodiment, all the inverter modules DC-AC 9a-9n have a second AC electric output which is connected to the sinusoidal filter 12 with interconnection of two contactors 13a to 13n, respectively. The output of the sinusoidal filter 12 is connected to one of the inputs of the auxiliary transformer 5 with interconnection of the contactor 22. The auxiliary transformer 5 has two power supply outputs, one is the auxiliary AC power supply 15 and the other is the auxiliary user power supply 16, which is optional. The function of the auxiliary AC power supply 15 is to power the components of the photovoltaic solar inverter 3 for its normal operation. In FIG. 9, for the sake of simplicity, it is observed that the auxiliary AC power supply 15 is connected to the DC-AC inverter modules 9a-9n and to the control module 8, but can power more components of the modular photovoltaic solar inverter 3. The control module 8 is connected, by means of a data link, to the DC-AC inverter modules 9a-9n, the contactors 13a-13n, the contactors 21 and 22 and to the connection/disconnection contactor 7 to which it sends control commands. The control commands are instructions such as stop, start-up, magnitude of the output voltage, magnitude of the output, opening, closing current, etc.

In the "normal" ("production") operating mode, that is to say, when the modular solar inverter supplies power to the AC network, the control module 8, by means of control commands, closes the connection/disconnection contactor 7 to the AC network 10, closes the contactor 21, opens the contactor 22 and adjusts the voltage and current at the common output 17 of the DC-AC inverter modules 9a-9n. The DC-AC inverter modules 9a-9n also power the auxiliary transformer 5 which generates the auxiliary AC power 15 and optionally the auxiliary user power supply 16. When the control module 8 detects an outage with the AC network which may be caused by maintenance works or by a fault in the AC network, the control module 8, by means of the control commands, opens the connection/disconnection contactor 7 to the AC network 10, opens the contactor 21, closes the contactor 22, selects one of the inverter modules (for example the module 9b), adjusts the voltage and the current at the output of the selected DC-AC inverter module and closes the contactor (13b) corresponding to the selected inverter module (9b). The power supply (power) provided by the selected inverter module, after being filtered by the filter 12, arrives to the auxiliary transformer 5 which generates the auxiliary AC power supply 15 and optionally the auxiliary user power supply 16. The control module 8 has a battery 31 which allows it to carry out the previously indicated steps until it receives power from the transformer 5. In the present exemplary embodiment, it is possible to combine at least two DC-AC inverter modules to generate the voltage and current necessary to power the transformer 5. In this case, the control module 8 would also close the contactors (13a-13n) of the selected DC-AC inverter modules and would adjust the voltage and current at the common output 17 of the DC-AC inverter modules 9a-9n by means of control commands.

In all the previous embodiments, both the power converter 1 and the solar inverters 2 and 3, in the "normal" operating mode (also called "production" mode), the inverter modules (9a-9n) operate as current sources. Whereas when there is a fault or disconnection in the AC network and the integrated power supply system of the present invention is applied, said inverter modules (9a-9n) have to work as voltage sources. This change in behavior in the inverter modules means that the power filter 23 shown in FIG. 5 is not valid. Instead, the sinusoidal filter 12 shown in FIG. 10 is used. Although both filters 12 and 23 shown in FIG. 10 seem identical, they are indeed in their configuration, but not in terms of the values of the elements (coils, capacitors) which form said filters 12, 23. That is to say, the sinusoidal filters are dimensioned according to the output voltage of the inverter modules which is different depending on whether it powers the AC network 10 or the auxiliary transformer 5. As is observed in FIG. 10, the input of the sinusoidal filter 12 is connected between the commutation electronics 26 and the contactor 24.

One possible embodiment of the sinusoidal filter 12 used in the embodiments shown in FIGS. 7, 8 and 9 is shown in FIG. 11. The sinusoidal filter 12 comprises two coils in series 27a, 27b/28a, 28b/29a, 29b per monophasic phase and a capacitor 30a, 30b, 30c connected in parallel between every two monophasic phases, such that the Pulse Width Modulation frequency "PWM" of the output voltage of the DC-AC inverter module 9 is converted to the frequency of 50/60 Hz of the AC network.

The invention claimed is:

1. An integrated power supply system for auxiliary services for power converters, comprising:
   an auxiliary transformer which comprises at least: two inputs and an auxiliary AC power supply output;
   at least two contactors;
   a sinusoidal filter whose output is connected to an input of the auxiliary transformer with interconnection of a contactor;

at least one DC-AC inverter module which comprises an input and two outputs; where the input is connectable to a DC source, an output is connected to the input of the sinusoidal filter and the other output is connected to a shared AC line which in turn is connected to the auxiliary transformer with interconnection of a contactor and connectable to an AC network;

a connection/disconnection contactor to the AC network situated in the shared AC line, between the output of the DC-AC inverter module and the AC network;

a control module configured to send control commands and connected to at least:
    the connection/disconnection contactor to the AC network;
    the contactors;
    the DC-AC inverter module;

where the control module is configured to select a power supply mode from among:
    the DC source;
    a set of batteries, and;
    the auxiliary AC power supply output;
        such that in order to carry out said selection of the power supply mode, the control module, by means of control commands, opens the connection/disconnection contactor to the AC network, opens the output contactor of the DC-AC inverter module, closes the output contactor of the AC sinusoidal filter and adjusts a voltage and current at the output of the DC-AC inverter module which connects to the sinusoidal filter so that the auxiliary transformer generates the auxiliary AC power.

2. The integrated power supply system for auxiliary services for power converters according to claim 1, further comprising at least one DC-AC inverter module a single output connected to the shared AC line.

3. The integrated power supply system for auxiliary services for power converters according to claim 1, further comprising at least two DC-AC inverter modules connected by means of two contactors to the sinusoidal filter such that the control module is configured to select, from the at least two DC-AC inverter modules, at least one DC-AC inverter module to which to send the control commands and where the contactor associated with the selected DC-AC inverter module receives a closing command.

4. The integrated power supply system for auxiliary services for power converters according to claim 1, wherein the DC-AC inverter module comprises a control step and a power step, where the power step comprises at least: fuses, a DC bus, a commutation electronics, a connection/disconnection contactor to the AC bus and a power filter.

5. The integrated power supply system for auxiliary services for power converters according to claim 4, wherein the sinusoidal filter is connected between the commutation electronics and the connection/disconnection contactor to the AC bus.

6. The integrated power supply system for auxiliary services for power converters according to claim 1, wherein the sinusoidal filter comprises at least two coils in series per monophasic phase and at least one capacitor connected in parallel between every two monophasic phases such that the Pulse-Width Modulation Frequency "PWM" of the output voltage of the DC-AC inverter module is converted to the frequency of 50/60 Hz of the AC network.

7. A power converter comprising an integrated power supply system for auxiliary services according to claim 1.

8. A solar inverter comprising an integrated power supply system for auxiliary services according to claim 1.

9. A modular solar inverter comprising an integrated power supply system for auxiliary services according to claim 1.

* * * * *

UNITED STATES PATENT AND TRADEMARK OFFICE
CERTIFICATE OF CORRECTION

Page 1 of 1

PATENT NO. : 11,070,079 B2
APPLICATION NO. : 16/628583
DATED : July 20, 2021
INVENTOR(S) : Antonio Poveda Lerma et al.

It is certified that error appears in the above-identified patent and that said Letters Patent is hereby corrected as shown below:

On the Title Page

Item (30), Column 1, Foreign Application Priority Data, Line 1, delete "ES201730880" and insert -- P201730880 --

In the Claims

Column 11, Line 35, Claim 2, after "module" insert -- with --

Signed and Sealed this
Seventh Day of December, 2021

Drew Hirshfeld
*Performing the Functions and Duties of the*
*Under Secretary of Commerce for Intellectual Property and*
*Director of the United States Patent and Trademark Office*